United States Patent
King

(10) Patent No.: US 8,301,723 B2
(45) Date of Patent: Oct. 30, 2012

(54) COMPUTER TO HANDHELD DEVICE VIRTUALIZATION SYSTEM

(75) Inventor: Benjamin John King, Dallas, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 182 days.

(21) Appl. No.: 12/714,229

(22) Filed: Feb. 26, 2010

(65) Prior Publication Data

US 2011/0213855 A1 Sep. 1, 2011

(51) Int. Cl.
*G06F 15/16* (2006.01)
(52) U.S. Cl. ......................... 709/217; 709/205
(58) Field of Classification Search .......... 709/200–203, 709/217–227, 228, 205
See application file for complete search history.

(56) References Cited

U.S. PATENT DOCUMENTS

| | | | |
|---|---|---|---|
| 5,906,657 A * | 5/1999 | Tognazzini | 709/248 |
| 6,216,158 B1 | 4/2001 | Luo et al. | |
| 6,374,306 B1 * | 4/2002 | Tognazzini | 709/248 |
| 6,470,396 B2 * | 10/2002 | Tognazzini | 709/248 |
| 6,754,710 B1 | 6/2004 | McAlear | |
| 6,779,023 B2 * | 8/2004 | Tognazzini | 709/208 |
| 6,915,327 B1 * | 7/2005 | Tuli | 709/203 |
| 7,047,282 B2 * | 5/2006 | Tognazzini | 709/218 |
| 7,062,573 B2 * | 6/2006 | Tognazzini | 709/248 |
| 7,089,332 B2 * | 8/2006 | Tognazzini | 709/248 |
| 7,159,186 B2 * | 1/2007 | Mattila et al. | 715/769 |
| 2001/0011308 A1 | 8/2001 | Clark | |
| 2002/0111995 A1 | 8/2002 | Mansour et al. | |
| 2003/0001864 A1 | 1/2003 | Charpentier | |
| 2003/0028609 A1 | 2/2003 | Cahill | |
| 2003/0222917 A1 | 12/2003 | Trantow | |
| 2003/0234809 A1 | 12/2003 | Parker | |
| 2004/0147280 A1 * | 7/2004 | Kamiya | 455/550.1 |
| 2004/0158829 A1 * | 8/2004 | Beresin et al. | 717/178 |
| 2004/0174398 A1 | 9/2004 | Luke et al. | |
| 2005/0223342 A1 | 10/2005 | Repka et al. | |
| 2005/0251558 A1 | 11/2005 | Zaki | |
| 2006/0031769 A1 | 2/2006 | Eizips | |
| 2007/0025330 A1 | 2/2007 | Levin | |
| 2007/0030857 A1 | 2/2007 | Fulknier et al. | |
| 2007/0118895 A1 | 5/2007 | Coskun et al. | |
| 2007/0124406 A1 | 5/2007 | Liu | |
| 2008/0034408 A1 | 2/2008 | Duggal | |
| 2008/0037519 A1 | 2/2008 | Liu | |

(Continued)

FOREIGN PATENT DOCUMENTS

DE 102004011569 A1 10/2005

(Continued)

OTHER PUBLICATIONS

O'Grady, Jason D.; The Apple Core; Title: "iPhone app organization comes to iTunes 9"; Sep. 10, 2009; 2 pgs.

(Continued)

*Primary Examiner* — Moustafa M Meky
(74) *Attorney, Agent, or Firm* — Conley Rose, P.C.; J. Robert Brown, Jr.

(57) ABSTRACT

A method on a handheld device is provided. The method comprises sending a request from the handheld device to initiate an application on a host computer, receiving data related to the application from the host computer at the handheld device, and displaying the data in a view of the application appearing on the handheld device.

20 Claims, 6 Drawing Sheets

U.S. PATENT DOCUMENTS

| | | | |
|---|---|---|---|
| 2008/0263178 A1 | 10/2008 | Hogue | |
| 2009/0131035 A1 | 5/2009 | Aiglstorfer | |
| 2011/0063191 A1* | 3/2011 | Leung et al. | 345/1.1 |

FOREIGN PATENT DOCUMENTS

| | | | |
|---|---|---|---|
| GB | 2459956 A | 11/2009 | |
| JP | 11038958 A | 2/1999 | |
| JP | 2006197299 A | 7/2006 | |
| WO | 2005096132 A1 | 10/2005 | |
| WO | 2009143294 A2 | 11/2009 | |

OTHER PUBLICATIONS

European Search and Examination Report; EP Application No. 10154883.2; Nov. 10, 2010; 10 pgs.

Choi, Charles Q., "Cell Phone 'Tricorders' Give Instant Medical Diagnosis"; May 1, 2008, 2 pages; http://www.foxnews.com/story/0,2933,353513,00.html.

GoToMyPCCorporate; 2004 Citrix Online; 2004; 5 pages http://www.citrix.com//site/resources/dynamic/salesdocs/citrix_gotomypc_corporate_technology_white_paper.pdf.

http://www.cns-service.com/citrix/citrix-gotomypc.aspx; Feb. 23, 2010—2 pages.

CNET Australia, Downloads; 2 pages; Feb. 26, 2010 http://www.cnet.com.au/downloads/soa/RDM/0,239030384,10784593s,00.htm.

European Examination Report; Application No. 10154883.2; May 10, 2012; 7 pages.

* cited by examiner

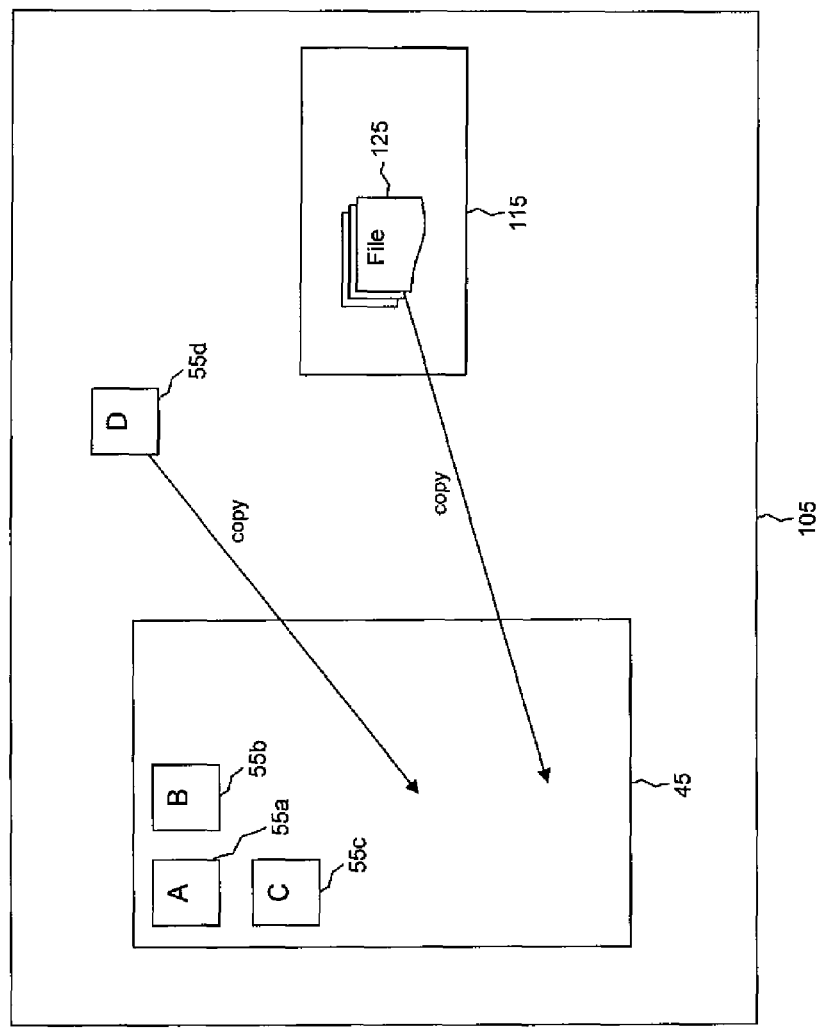
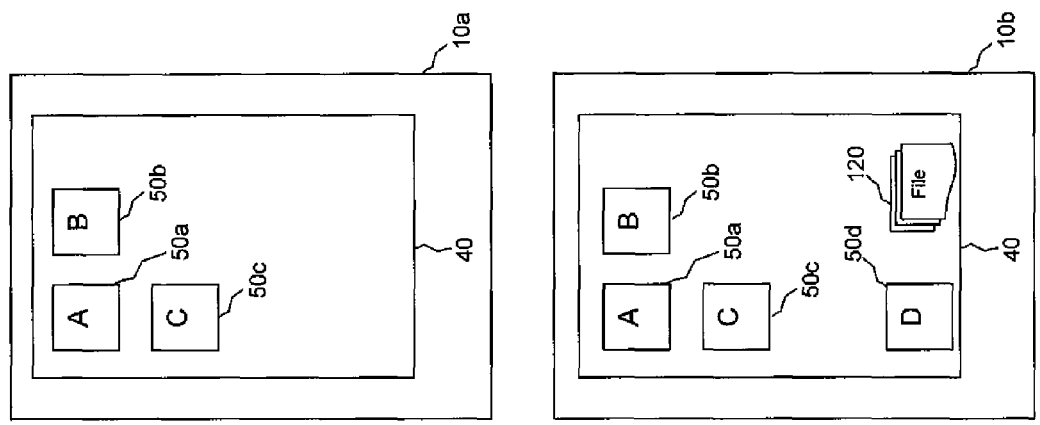
Figure 2

COMPUTER TO HANDHELD DEVICE VIRTUALIZATION SYSTEM

BACKGROUND

As used herein, terms such as "handheld device", "handheld", "user equipment", "UE", and the like might refer to devices, such as mobile phones, mobile wireless devices (including digital, cellular, or dual mode devices), personal digital assistants, laptop/tablet/notebook computers, or any other portable, end user device or system that can connect to a wireless telecommunications network. The screen size and resolution of a typical handheld device are generally smaller than the screen size and resolution of a typical desktop computer. For example, a typical handheld device might have a resolution of 320 by 240 pixels, while a typical desktop computer might have a resolution of 1600 by 1200 pixels.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates copying an icon onto a representation of a display screen of a UE, according to an embodiment of the disclosure.

DETAILED DESCRIPTION

Figure 1:
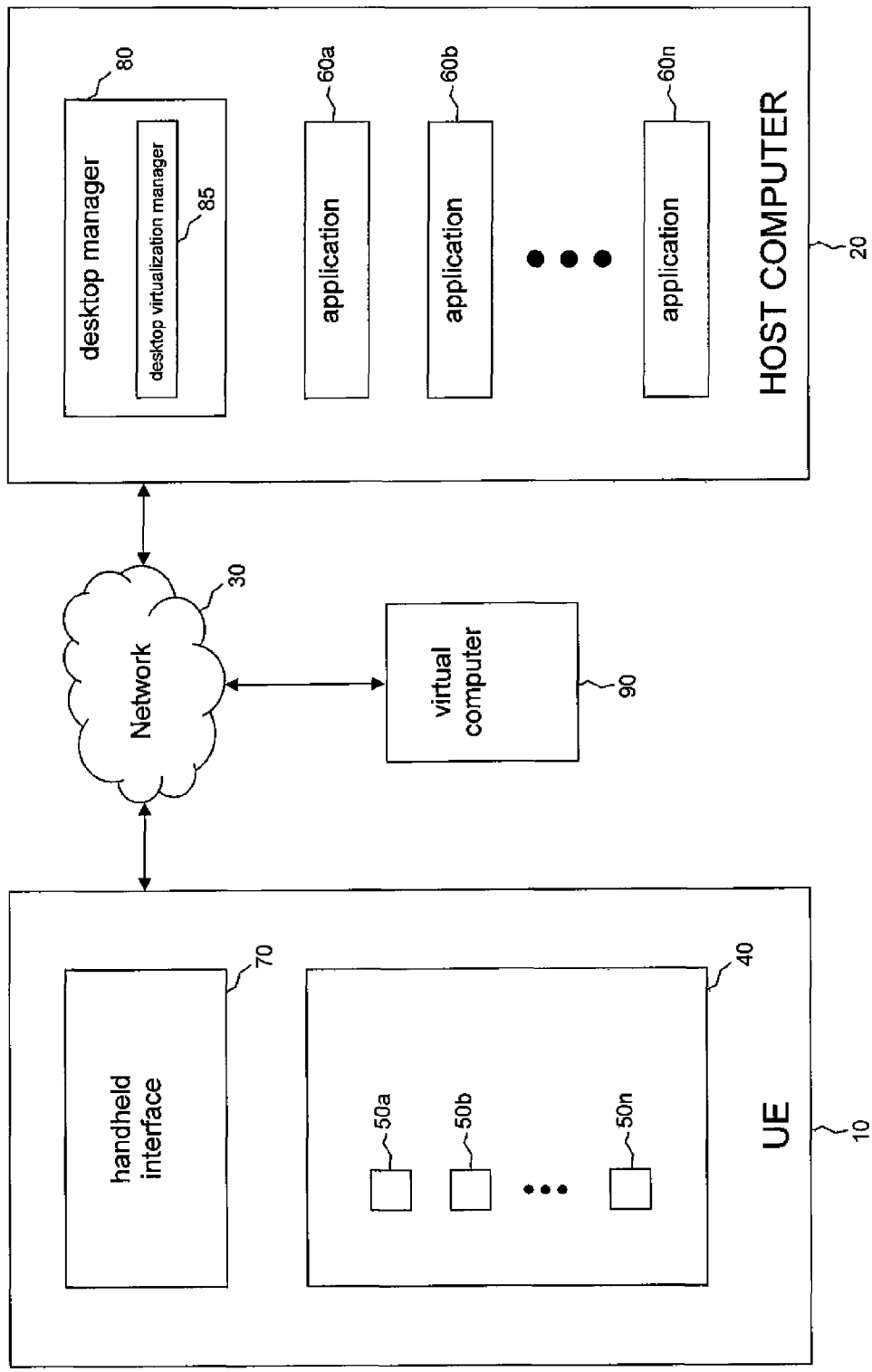
FIG. 1 is a diagram of a handheld device and a host computer, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Desktop virtualization systems have been developed to allow a desktop computer to remotely access another desktop computer. For example, a worker working at home might use a home desktop computer to initiate and log in to a desktop virtualization system. Via the desktop virtualization system, the worker might be able to gain access to applications and files that reside on the worker's office desktop computer. Such a system would typically provide the entire desktop image of the office, or host, computer to the home, or remote, computer. That is, the desktop virtualization system might reproduce on the remote computer all of the icons, menu bars, tool bars, task bars, and other images that appear on the host computer.

Similar systems have been developed to allow a handheld device to gain access to a host computer. That is, when a user logs on to a desktop virtualization system via a handheld device, the entire desktop image that typically appears on a host computer might appear on the handheld device. Recreating the entire desktop image of the host computer on the handheld device can be frustrating for the user because the resolution of the host computer is typically much larger than the resolution of the handheld. Shrinking the large-scale host computer images to fit into the small screen of the handheld device can make the images on the handheld screen difficult to see and manipulate.

In an embodiment, a handheld device can gain access to an application on a host computer without initializing and logging in to a desktop virtualization system. Instead, a user of a handheld device can simply select an icon on the handheld device or perform a similar action on the handheld device in order to initiate execution of an application on a host computer. The user can then interact with a virtual version of the application on the handheld device as if interacting with the actual version of the application on the host computer. Inputs made into the virtual version of the application on the handheld device are sent to the corresponding application on the host computer. The application can process the inputs as if they were entered directly into the host computer and provide outputs equivalent to those that would be provided if the inputs were entered directly into the host computer. The host computer then transfers these outputs to the handheld device. A virtualization management component on the host computer and/or on the handheld device can cause the outputs to be displayed on the screen of the handheld device in a size and form that are customized for the size and shape of the handheld's screen.

In this way, the user can interact on the handheld device with a virtual instance of an application that is actually executing on the host computer. The user enters inputs and sees and hears outputs as if interacting with the actual application and is able to access the features of the actual application, but the interactions occur on the handheld device in a small-scale version of application's usual display. All of this can be done without the need for the user to initiate and log in to a desktop virtualization system.

These embodiments are illustrated in FIG. 1, where a handheld device or UE 10 can communicate with a host computer 20 via a wireless telecommunications network 30 (e.g., via a data connection on a Global System for Mobile communications (GSM) network). The host computer 20 might be a personal computer or might be one or more server computers. The network 30 may include a plurality of well known components, such as relays and servers. A display screen 40 on the UE 10 includes one or more icons 50 or other means of data input, such as menu items. All or some of the icons 50 may be linked to a corresponding application 60, file, or folder on the host computer 20, such that selecting one of the icons 50 initiates the execution of a corresponding application 60 or the opening of the corresponding file or folder. Hereinafter, the term application 60 might refer to any application, file, or folder that can be accessed in this manner.

Selection of one of the icons 50 might send an activation command to the network 30, which routes the command to a desktop management component 80 running on the host computer 20 or elsewhere. The desktop manager 80 might be an existing component for managing the functionality of the UE 10 that has been provided with the additional functionality described herein, or might be a component with the functionality described herein that is added to the host computer 20. A handheld interface component 70 might be present in the UE 10 to relay data between the UE 10 and the network 30 and possibly perform additional functions. While the handheld interface 70 and the desktop manager 80 are depicted as separate components residing on different devices, some or all of the actions described herein as occurring in one of these components might occur in the other component, in both components, and/or in the network 30. For example, some functions described as belonging to the desktop manager 80 might in some cases belong to the handheld interface 70.

Upon receiving a command from the UE 10 to initiate one of the applications 60, the desktop manager 80 issues a corresponding command to the operating system on the host computer 20, and this initiates the execution of the application 60 associated with the selected icon 50. The application's graphical output is sent by the desktop manager 80 to the network 30, and the network 30 routes the output to the UE 10. The UE 10 then displays the graphical output from the application 60 on its display screen 40. The handheld interface 70 and/or the desktop manager 80 might modify the output so that the output appears in an appropriate form on the display screen 40.

Once the application has been initiated, user commands, such as the activation of menu items or buttons or the entry of text, can be entered into the virtual instance of the application on the UE 10. The commands are then sent to the desktop manager 80 via the network 30. The desktop manager 80 then issues corresponding commands to the appropriate application 60 running on the host computer 20. The output generated when the application 60 executes the commands is then sent, via the network 30, to the UE 10, where the output can be displayed in an appropriate form in the virtual instance of the application. Hence, the user is able to interact with the application 60 using the UE 10, even though the application 60 is running on the host computer 20.

In an embodiment, the user can populate the display screen 40 with the icons 50 through interactions with the desktop manager 80. To do so, the user can select a desktop virtualization management feature 85 available through the desktop manager 80. The desktop virtualization manager 85 might be an additional component added to the existing desktop management functionality already present on the host computer 20, as shown in FIG. 1, or might be a separate component from the desktop manager 80. Upon being initiated, the desktop virtualization manager 85 displays on the display screen of the host computer 20 an image that depicts the display screen 40 of the UE 10. The user can drag an icon from the host computer's display screen (or an icon located anywhere else on the host computer 20) onto the virtual version of the UE's display screen shown on the host computer's display screen. When the host computer 20 is synchronized with the UE 10, the icons that were dragged onto the virtual version of the UE's display screen will appear on the UE's actual display screen 40. When the user views the display screen 40 on the actual UE 10, the user sees all the icons 50 that were placed onto the virtual version of the UE's display screen. The user can then use these icons 50 to open applications 60 as described above.

As an example, a user of the UE 10 might wish to be able to open on the UE 10 a spreadsheet that is located on the host computer 20. To set up this capability, the user might click on a "desktop virtualization manager" button or perform a similar action on the host computer 20 which might be accessed via a browser or other component of the UE 10. The desktop virtualization manager 85 would then start up and cause a virtual version of the UE's display screen to appear on the host computer's display screen. The user could then drag an icon or other representation of the spreadsheet across the host computer's display screen and into the UE's virtual display screen. The UE 10 could then have its actual display screen 40 updated over the air or by being connected to the host computer to include the icon of the spreadsheet. If the user then activated the icon of the spreadsheet on the UE 10, the actual spreadsheet on the host computer 20 would be opened, and the user would be able to manipulate the actual spreadsheet by manipulating the virtual instance of the spreadsheet on the UE 10.

As another example, a user may store multiple files in a folder on the desktop of the host computer 20. The user could open the desktop virtualization manager 85, thus causing a virtual version of the UE's display screen to appear on the display screen of the host computer 20. The user could drag and drop the folder from the desktop of the host computer 20 onto the UE's virtual desktop and then have access from the UE 10 to the multiple files in the folder. Put in more detail, when the user clicks on the folder icon in the display screen 40 on the UE 10, the icon activation will be treated as described above and the folder on the host computer 20 will be started like any other application 60 on the host computer 20. Specifically, the host computer 20 opens the folder and relays to the UE 10 the graphical output generated by opening the folder. Subsequent interactions with the open folder (e.g., clicking on icons or opening files in the folder) will be virtualized and the user may interact with the contents of the folder as if sitting at the host computer 20.

FIG. 2 illustrates the above embodiments. The display screen 40 of the UE 10*a* includes three icons 50 arranged in a particular pattern. When the desktop virtualization manager is started on the host computer, an image 45 of the UE display screen 40 appears on the display screen 105 of the host computer. The image 45 might include icons 55 that are equivalent to the icons 50 on the UE display screen 40 and that are arranged in the same pattern as the icons 50 on the UE display screen 40. Alternatively, the image 45 might simply replicate the general appearance of the UE 10*a* and its display screen 40, but the icons 50 that appear on the UE display screen 40 might not be replicated on the image 45 of the UE display screen 40 that appears on the display screen 105 on the host computer.

Portions of the display screen 105 of the host computer that do not include the image 45 of the UE display screen 40 might include icons and other representations of applications and files that reside on the host computer. In the embodiment of FIG. 2, an icon 55*d* and a display 115 of a file management application appear on the display screen 105 of the host computer. If a user of the UE 10*a* wished to be able to use the UE 10*a* to open an application that resides on the host computer and that is associated with the icon 55*d*, the user could copy the icon 55*d* onto the image 45 of the UE display screen 40. If the user wished to be able to use the UE 10*a* to open a file on the host computer, the user could copy the image 125 of the file from the file management application 115 onto the image 45 of the UE display screen 40.

The user could then perform a synchronization operation as described above between the UE 10*a* and the host computer. After the synchronization, the display screen 40 of the UE 10*b* would display an icon 50*d* that is equivalent to the icon 55*d* that appeared on the display screen 105 of the host computer and an icon 120 that is equivalent to the file image 125 that appeared on the display screen 105 of the host computer. The icons 50*d* and 120 could then be used as described above to access an application and/or a file from the UE 10*b*.

In addition, the handheld interface 70 and/or the desktop manager 80 might resize the output of the application 60 so as to be more easily displayed on the UE 10. For example, an application's display size may default to the host computer's desktop resolution (e.g., 1600 by 1200 pixels), which is much larger than a UE's resolution (e.g., 320 by 240 pixels). Hence, the handheld interface 70 and/or the desktop manager 80 may resize the output of the application 60 to a size that is more manageable on the UE 10 before the application 60 is virtualized to the UE 10. For instance, the handheld interface 70 and/or the desktop manager 80 may resize the output of the application 60 to 640 by 480 pixels (from 1600 by 1200 pixels) to reduce the amount of panning and zooming a user would have to do on the UE 10 to use the application 60. Additionally, the menus, tool bars, and other user interface components of the application 60 might be edited to fit and be useable on the smaller screen 40 of the UE 10. In some instances, only certain of these components, tools, and menus might be displayed on the UE 10, which might be customizable by the user, to further optimize the limited space available on the display of the UE 10.

In an embodiment, the desktop manager 80 may inspect a file to be opened and may open the file with a special application instead of the application that is normally used to open the file on the host computer 20. As an example, the desktop manager 80 may use a text editor optimized for handheld devices (e.g., DataViz Word To Go) instead of a full-scale word processing application to open a text document on the host computer 20, and may virtualize the text editor to the UE 10 so that the document can be more easily edited on the UE 10.

In an embodiment, instead of the applications 60 executing on the host computer 20, equivalent applications may run on a virtual computer 90 (e.g., a Windows client terminal hosted by Microsoft Windows Terminal Server). Further, the virtual computer 90 may be started by an icon activation sent by the UE 10, as described above.

As an example, the user may activate an icon 50 on the UE 10 and the activation may be sent through the network 30. A component in the network 30 may then initiate a Windows client terminal or a similar application on the virtual computer 90 and send the icon activation to the Windows client terminal. The Windows client terminal may then execute an application on the virtual computer 90 that is equivalent to an application 60 on the host computer 20 and may send a virtualized version of the application to the UE 10. In this way, the user's host computer 20 need not be connected or even powered on, and the user can still access corporate applications and data via the Windows client terminal. Also, when the user has finished using the application and closes it on the UE 10, the virtual computer 90 may be automatically shut down.

Further, the Windows client terminal or any application being run by the client terminal may be directly virtualized to the UE 10. Also, the Windows client terminal display size or the desktop icons available within the terminal may be customized by the user or an administrator. This customization may be performed by the user at the user's host computer 20 or may be performed by the user via the UE 10 to which the client terminal is being virtualized. As an example, the Windows client terminal could have its resolution set to the resolution of the UE 10.

With existing desktop virtualization systems, users may be limited to the one desktop that is being virtualized, even though the users may need to access different applications from different computers (e.g., a home computer, an office computer, a terminal hosted by Microsoft Windows Terminal Server, and the like).

In an embodiment, a user may run the desktop virtualization manager 85 on multiple host computers 20 (e.g., an office computer and a home computer). In such a case, the virtual version of the UE's display screen that is generated by the desktop virtualization manager 85 may display all the icons loaded onto that virtual display screen from all the computers the UE 10 has been connected to. Alternatively, the virtual version of the UE's display screen may display only the icons loaded onto that virtual display screen from the computer that the UE 10 is currently connected to. As another alternative, the virtual version of the UE's display screen may display all the icons loaded onto that virtual display screen from all the computers the UE 10 has been connected to, but may provide an indication of which icons are from the currently connected computer (e.g., by graying out icons from other computers). Hence, the user can use multiple applications from multiple computers and have complete access to required data and applications.

Figure 3A:
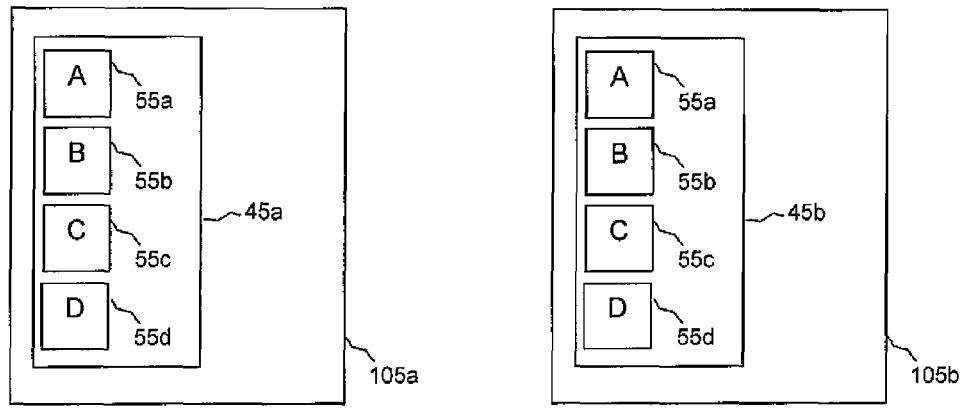
FIGS. 3a-3c illustrate icons on representations of display screens, according to embodiments of the disclosure.
Figure 3B:
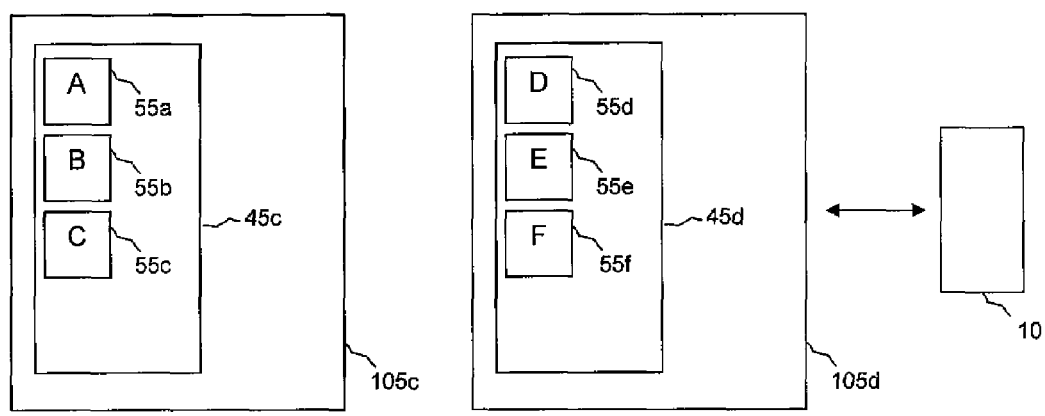
Figure 3C:
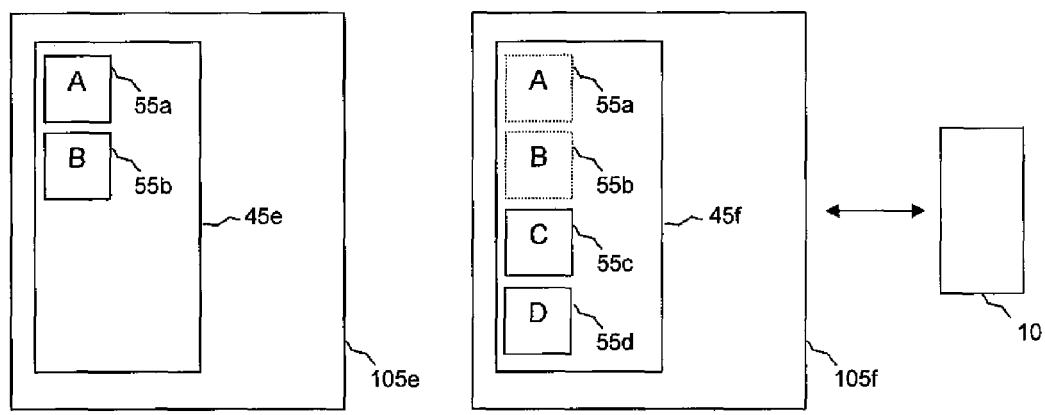

FIGS. 3a-3c illustrate these embodiments. In FIG. 3a, display screen 105a might appear on a home host computer and display screen 105b might appear on an office host computer, for example. Images 45a and 45b appear on each host computer display screen 105a and 105b, respectively, and replicate the appearance of a UE display screen. All of the icons 55 that have been copied onto either of the display screens 45 appear on both display screens 45. For example, icons 55a and 55b may have been copied onto display screen 45a from the home host computer, and icons 55c and 55d may have been copied onto display screen 45b from the office host computer, but all four icons 55 appear on both display screens 45.

In FIG. 3b, display screen 105c might appear on a home host computer and display screen 105d might appear on an office host computer. A UE 10 might currently be connected to the office host computer. Therefore, the image 45d that appears on the display screen 105d of the office host computer includes only the icons 55d, 55e, and 55f that were copied onto the image 45d from the office host computer. Since the UE 10 is not currently connected to the home host computer, the icons 55a, 55b, and 55c that were copied onto the image 45c from the home host computer do not appear on the image 45d on the office host computer.

In FIG. 3c, display screen 105e might appear on a home host computer, display screen 105f might appear on an office host computer, and a UE 10 might currently be connected to the office host computer. Icons 55a and 55b might have been copied onto the image 45e from the home host computer, and icons 55c and 55d might have been copied onto the image 45f from the office host computer. All of the icons 55a, 55b, 55c, and 55d appear on the image 45f on the office host computer, but since the UE 10 is connected to the office host computer, the icons 55c and 55d that were copied onto the image 45f from the office host computer have a different appearance from the icons 55a and 55b that were copied onto the image 45e from the home host computer.

In some cases, a corporation or other large enterprise may want to limit its employees to being able to virtualize to their handheld devices only certain portions of a host computer's desktop. In an embodiment, an enterprise adopting the systems and methods described herein may limit the types of applications a user can put on a handheld device. An enterprise may also put on its employees' handheld devices standardized applications that are run on a corporate server instead of on a user-controlled computer. For example, a corporation may set up a virtual computer on a server (using, e.g., Microsoft Windows Terminal Server), such that the virtual computer runs an application to which the corporation wants all handheld users to have access. For each request from a different handheld to run the application, the virtual computer might run a separate copy of the application and virtualize it to the respective handheld devices. Alternatively, the corporation may set up the environment so that requests for the application from different handhelds are sent to unique virtual computers that then individually run the application and virtualize the application to the handhelds.

In an alternative embodiment, the UE 10 might be connected to a desktop computer, a laptop computer, or some other computing device that has a larger keyboard and display screen than the UE 10. The connection between the UE 10 and the other computer might be a wired connection, such as USB, or might be a wireless connection, such as WiMAX or Bluetooth. The UE 10 could interact with an application 60 as described above, and the user would have the convenience of interacting with the UE 10 via the other computer's large-size keyboard and display screen. That is, the other computer would act as a "dumb" terminal that provides input and output functions, while the majority of the processing for the execution and display of the application 60 would occur on the host computer 20 and the UE 10.

Figure 4:
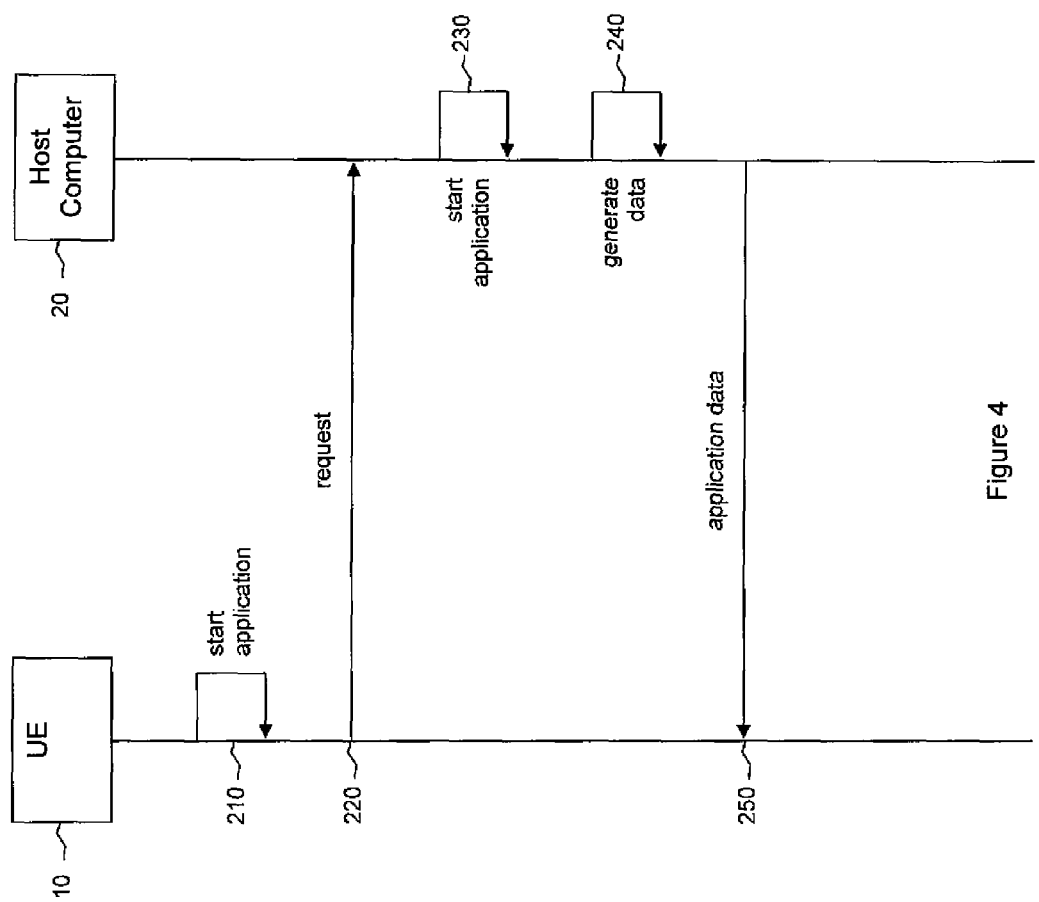
FIG. 4 is a message flow diagram for application virtualization between a handheld device and a host computer, according to an embodiment of the disclosure.

FIG. 4 is an embodiment of a message flow diagram for application virtualization between the UE 10 and the host computer 20. At event 210, an action is taken on the UE 10 to start an application. The action might be the selection of an icon on the UE 10 or a similar action. At event 220, a request is sent from the UE 10 to the host computer 20 to launch an application on the host computer 20 that corresponds to the action that was taken at event 210. At event 230, the appropriate application is initiated on the host computer 20. At event 240, application-related data is generated on the host computer 20. For example, a startup screen for the application might be generated. At event 250, the application-related data is transmitted from the host computer 20 to the UE 10. The application-related data might be modified to fit appropriately into the display screen of the UE 10.

Additionally, the application requested by the UE 10 may be launched as a sub process of the desktop manager on the host computer 20 or the application may be launched as a background process on the host computer 20. Further, the display of the application may be hidden on the host computer 20 while it is being virtualized to the UE 10 to provide for controlling the application via the UE 10 without interference from human device inputs received from peripherals attached to the host computer.

Figure 5:
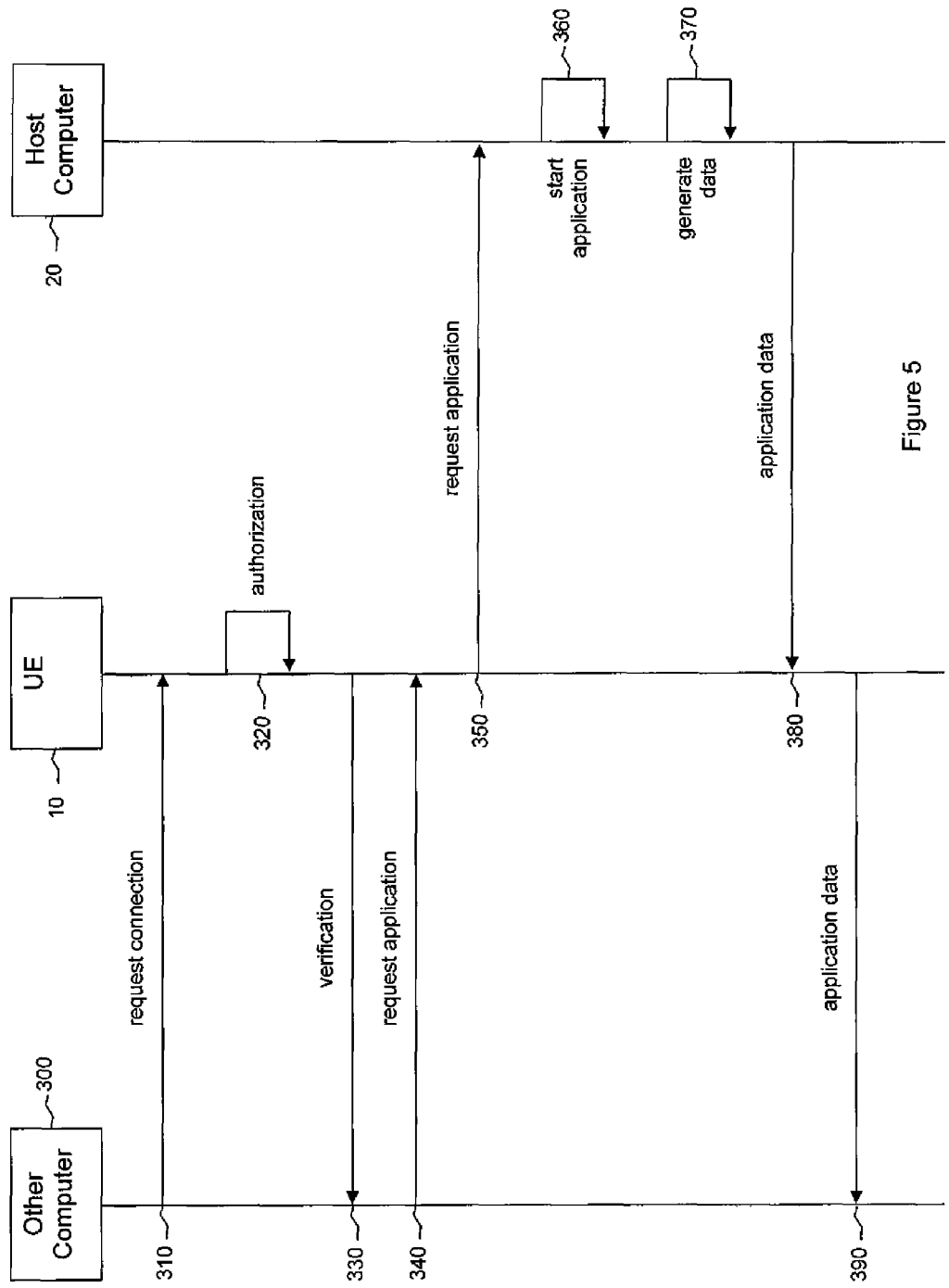
FIG. 5 is a message flow diagram for application virtualization between a remote computer and a host computer via a handheld device, according to an embodiment of the disclosure.

FIG. 5 is an embodiment of a message flow diagram for application virtualization between the host computer 20 and another computer 300 via the UE 10. At event 310, the other computer sends a connection request to the UE 10. At event 320, the UE 10 might perform an authorization procedure on the other computer 300. If the other computer 300 is authorized to access the UE 10, the UE 10 sends a verification message to the other computer 300 at event 330. At event 340, the other computer 300 sends the UE 10 a request for the initiation of an application that resides on the host computer 20.

At event 350, the UE 10 sends the host computer 20 a request to start the application. At event 360, the appropriate application is initiated on the host computer 20. At event 370, application-related data is generated on the host computer 20. At event 380, the application-related data is transmitted from the host computer 20 to the UE 10. At event 390, the application-related data is transmitted from the UE 10 to the other computer 300.

Existing desktop virtualization systems, such as Citrix GoToMyPC, might allow a user to run an application on a host computer and see the display of the application on a handheld device, with the net effect that the user could run an office application with a handheld device. However, existing desktop virtualization systems do not account for the unique constraints stemming from the handheld device's display and the network connection. Existing desktop virtualization systems merely replicate the host computer's desktop onto the remote handheld, possibly displaying elements the user rarely uses. Also, existing desktop virtualization systems do not allow for running applications virtualized from multiple different computers.

The embodiments disclosed herein provide for managing the handheld's virtual desktop separately from the host computer's desktop. By dragging and dropping applications onto their virtual desktops, users are able to easily access the applications and data on their handhelds even though the applications and data may be located on their office/home/virtual computers. The disclosed embodiments also allow a user (and/or a corporation) to manipulate and control which applications from the user's computers will be virtualized to the user's handheld. By being allowed to easily choose which of their desktop applications to virtualize to their handheld devices, users are able to easily use rich, full-featured applications on their handheld devices without being overloaded with other desktop applications that they may not use or have need of on their handheld devices. The disclosed embodiments also provide for manipulation of the size of the display of the applications so as to better fit onto a handheld device. The disclosed embodiments may not require users to provide configuration or security parameters to access their applications, as might be needed with existing desktop virtualization systems. Also, the disclosed embodiments do not require a user to initialize a virtual session before accessing an application remotely, as might be needed with existing desktop virtualization systems. Instead, the user can simply select an application on a handheld device, and a corresponding application will be launched on a host computer.

Figure 6:
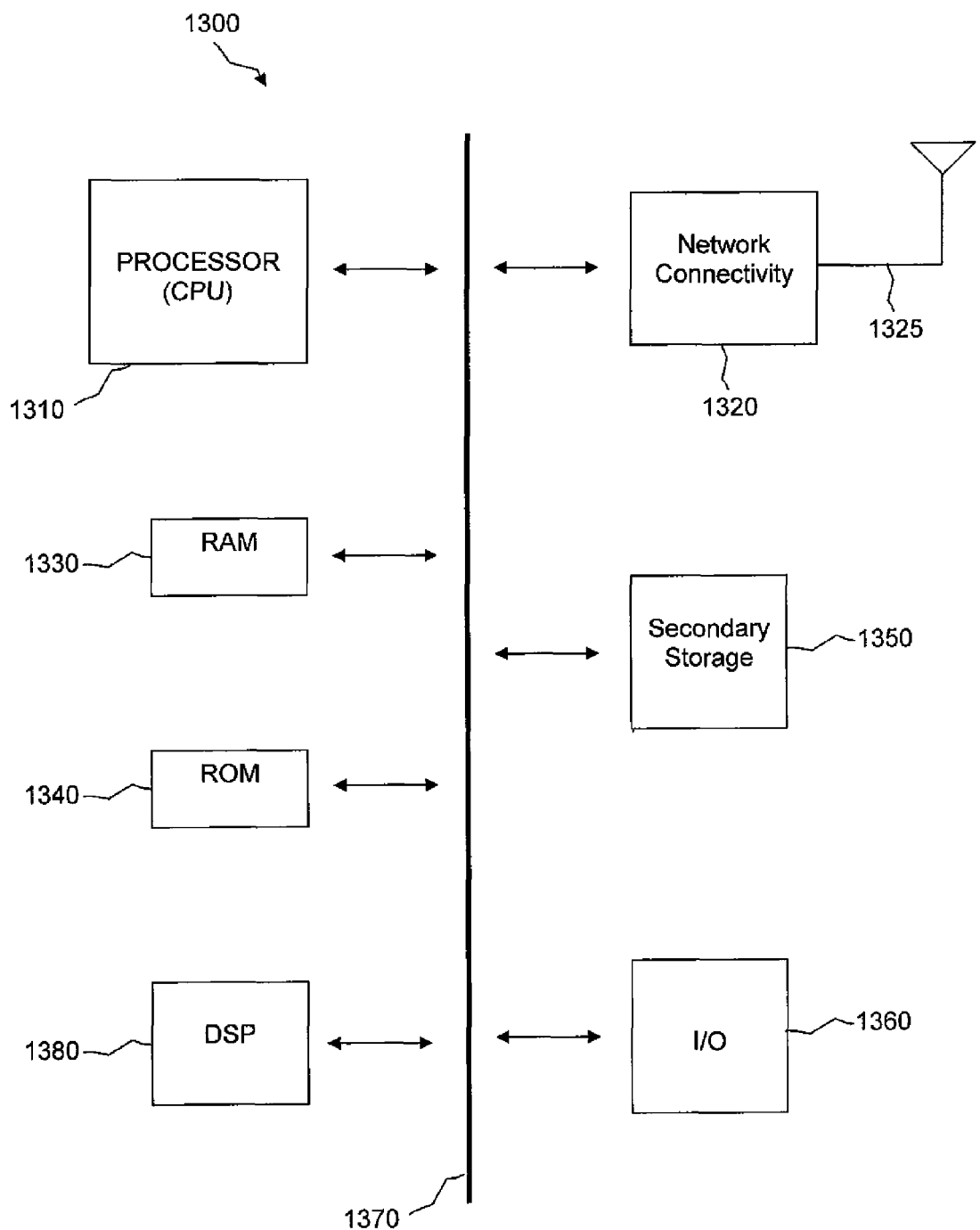
FIG. 6 illustrates a processor and related components suitable for implementing the several embodiments of the present disclosure.

The UE 10 and other components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (COMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method on a handheld device is provided, The method comprises sending a request from the handheld device to initiate an application on a host computer, receiving data related to the application from the host computer at the handheld device, and displaying the data in a view of the application appearing on the handheld device.

In another embodiment, a handheld device is provided. The handheld device includes a processor configured such that the handheld device sends a request to initiate an application on a host computer, receives data related to the application from the host computer, and displays the data in a view of the application appearing on the handheld device.

In another embodiment, a method is provided for an application on a host computer to be accessed by a handheld device. The method comprises receiving by the host computer a request from the handheld device to initiate the application, initiating the application on the host computer, and sending data related to the application from the host computer to the handheld device, the data displayable in a view of the application appearing on the handheld device.

In another embodiment, a host computer is provided. The host computer includes a processor configured such that the host computer receives a request from a handheld device to initiate an application, initiates the application, and sends data related to the application to the handheld device, the data displayable in a view of the application appearing on the handheld device.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A method on a handheld device, the method comprising:
sending a request from the handheld device to initiate an application on a host computer;
receiving data related to the application from the host computer at the handheld device;
displaying the data in a view of the application appearing on the handheld device;
the handheld device receiving user data entered into the view of the application;
the handheld device sending the user data to the host computer, the host computer processing the user data;

the handheld device receiving additional application-related data generated by the application based on the user data; and the handheld device displaying the additional application-related data in the view of the application, wherein a remote computer is connected to the handheld device such that user data entered into the remote computer is entered into the view of the application and transferred from the view of the application to the application on the host computer, and such that data received by the handheld device from the application on the host computer is displayed on the display screen of the remote computer.

2. The method of claim 1, wherein the host device processes the user data in the same manner as data entered directly into the host computer.

3. The method of claim 1, wherein the initiation request is sent to the host computer as a result of a selection of an icon on a display screen of the handheld device, and wherein the icon is placed on the display screen of the handheld device by copying a corresponding icon from a display screen of the host computer onto an image of the display screen of the handheld device, the image of the display screen of the handheld device appearing on the display screen of the host computer.

4. The method of claim 3, wherein a plurality of icons are copied onto the image of the display screen of the handheld device from a plurality of host computers.

5. A handheld device, comprising:
a processor configured such that the handheld device:
sends a request to initiate an application on a host computer;
receives data related to the application from the host computer;
displays the data in a view of the application appearing on the handheld device;
receives user data entered into the view of the application;
sends the user data to be processed by the host computer;
receives additional application-related data generated by the application based on the user data; and
displays the additional application-related data in the view of the application,
wherein a remote computer is connected to the handheld device such that user data entered into the remote computer is entered into the view of the application and transferred from the view of the application to the application on the host computer, and such that data received by the handheld device from the application on the host computer is displayed on the display screen of the remote computer.

6. The handheld device of claim 5, wherein the handheld device adjusts the data related to the application to fit a screen resolution and screen size of the handheld device.

7. The handheld device of claim 5, wherein the handheld device sends the initiation request to and receives the data related to the application from a virtual host computer.

8. The handheld device of claim 5, wherein the initiation request is sent to the host computer as a result of a selection of an icon on a display screen of the handheld device, and wherein the icon is placed on the display screen of the handheld device by copying a corresponding icon from a display screen of the host computer onto an image of the display screen of the handheld device, the image of the display screen of the handheld device appearing on the display screen of the host computer.

9. A method for an application on a host computer to be accessed by a handheld device, comprising:

receiving by the host computer a request from the handheld device to initiate the application;
initiating the application on the host computer;
sending data related to the application from the host computer to the handheld device, the data displayable in a view of the application appearing on the handheld device;
receiving by the host computer user data from the handheld device, the user data having been entered into the view of the application;
processing, by the host computer, the user data; and
sending from the host computer to the handheld device additional application-related data generated by the application based on the user data, the additional application-related data displayable on the handheld device in the view of the application,
wherein a remote computer is connected to the handheld device such that user data entered into the remote computer is entered into the view of the application and transferred from the view of the application to the application on the host computer, and such that data sent from the application on the host computer is displayed on the display screen of the remote computer.

10. The method of claim 9, wherein the host device processes the user data in the same manner as data entered directly into the host computer.

11. The method of claim 9, wherein the data related to the application is adjusted to fit a screen resolution and screen size of the handheld device, the adjustment being performed by at least one of:
the handheld device; and
the host computer.

12. The method of claim 9, wherein the host computer is a virtual computer.

13. The method of claim 9, wherein the application on the host computer is initiated by a selection of an icon on a display screen of the handheld device, the icon having been placed on the display screen of the handheld device by copying a corresponding icon from a display screen of the host computer onto an image of the display screen of the handheld device, the image of the display screen of the handheld device appearing on the display screen of the host computer.

14. The method of claim 13, wherein a plurality of icons are copied onto the image of the display screen of the handheld device from a plurality of host computers.

15. A host computer, comprising:
a processor configured such that the host computer:
receives a request from a handheld device to initiate an application, initiates the application;
sends data related to the application to the handheld device, the data displayable in a view of the application appearing on the handheld device;
receives user data from the handheld device, the user data having been entered into the view of the application;
processes the user data in the same manner as data entered directly into the host computer; and
sends additional application-related data generated by the application based on the user data, the additional application-related data displayable on the handheld device in the view of the application,
wherein a remote computer is connected to the handheld device such that user data entered into the remote computer is entered into the view of the application and transferred from the view of the application to the application on the host computer, and such that data sent from the application on the host computer is displayed on the display screen of the remote computer.

16. The host computer of claim 15, wherein the host computer processes the user data in the same manner as data entered directly into the host computer.

17. The host computer of claim 15, wherein the host computer adjusts the data related to the application to fit a screen resolution and screen size of the handheld device.

18. The host computer of claim 15, wherein the host computer is a virtual computer.

19. The method of claim 15, wherein the application on the host computer is initiated by a selection of an icon on a display screen of the handheld device, the icon having been placed on the display screen of the handheld device by copying a corresponding icon from a display screen of the host computer onto an image of the display screen of the handheld device, the image of the display screen of the handheld device appearing on the display screen of the host computer.

20. The host computer of claim 19, wherein a plurality of icons are copied onto the image of the display screen of the handheld device from a plurality of host computers.

* * * * *